United States Patent
Patel et al.

(10) Patent No.: US 11,296,340 B2
(45) Date of Patent: Apr. 5, 2022

(54) HUMIDITY TRANSFER ASSEMBLIES FOR FUEL CELLS AND HIGHER-TEMPERATURE ELECTROCHEMICAL SYSTEMS

(71) Applicant: FuelCell Energy, Inc., Danbury, CT (US)

(72) Inventors: Pinakin Patel, Danbury, CT (US); Jonathan Malwitz, Danbury, CT (US); Ludwig Lipp, Brookfield, CT (US); Jesse Roy, Danbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 120 days.

(21) Appl. No.: 16/554,957

(22) Filed: Aug. 29, 2019

(65) Prior Publication Data
US 2020/0075976 A1 Mar. 5, 2020

Related U.S. Application Data

(60) Provisional application No. 62/725,042, filed on Aug. 30, 2018.

(51) Int. Cl.
*H01M 8/04291* (2016.01)
*H01M 8/04119* (2016.01)
*H01M 8/0656* (2016.01)
*H01M 8/04828* (2016.01)

(52) U.S. Cl.
CPC ... *H01M 8/04291* (2013.01); *H01M 8/04141* (2013.01); *H01M 8/04149* (2013.01); *H01M 8/04843* (2013.01); *H01M 8/0656* (2013.01)

(58) Field of Classification Search
CPC ......... H01M 8/04291; H01M 8/04141; H01M 8/04149; H01M 8/04843; H01M 8/0656
USPC .................................................. 429/413, 414
See application file for complete search history.

(56) References Cited

U.S. PATENT DOCUMENTS

| 4,791,033 A | 12/1988 | Patel |
| 2011/0303550 A1 | 12/2011 | Coelho Tsou et al. |
| 2014/0193726 A1* | 7/2014 | Noh ................... H01M 8/04067 429/414 |
| 2016/0036073 A1* | 2/2016 | Kim ................... H01M 8/04291 429/414 |

FOREIGN PATENT DOCUMENTS

| CN | 206961949 U | * | 2/2018 |
| KR | 20100131631 A | * | 12/2010 |

* cited by examiner

*Primary Examiner* — Sean P Cullen
(74) *Attorney, Agent, or Firm* — Foley & Lardner LLP

(57) ABSTRACT

A humidity transfer assembly includes a pressure vessel and a humidity transfer device disposed in the pressure vessel. The humidity transfer device includes an enclosure, a first inlet line fluidly coupled to the enclosure and configured to supply anode exhaust thereto, a first outlet line fluidly coupled to the enclosure and configured to output anode exhaust therefrom, and a second inlet line fluidly coupled to the enclosure and configured to supply feed gas thereto. The humidity transfer device is configured to transfer steam from anode exhaust to feed gas and to output feed gas into the pressure vessel.

20 Claims, 6 Drawing Sheets

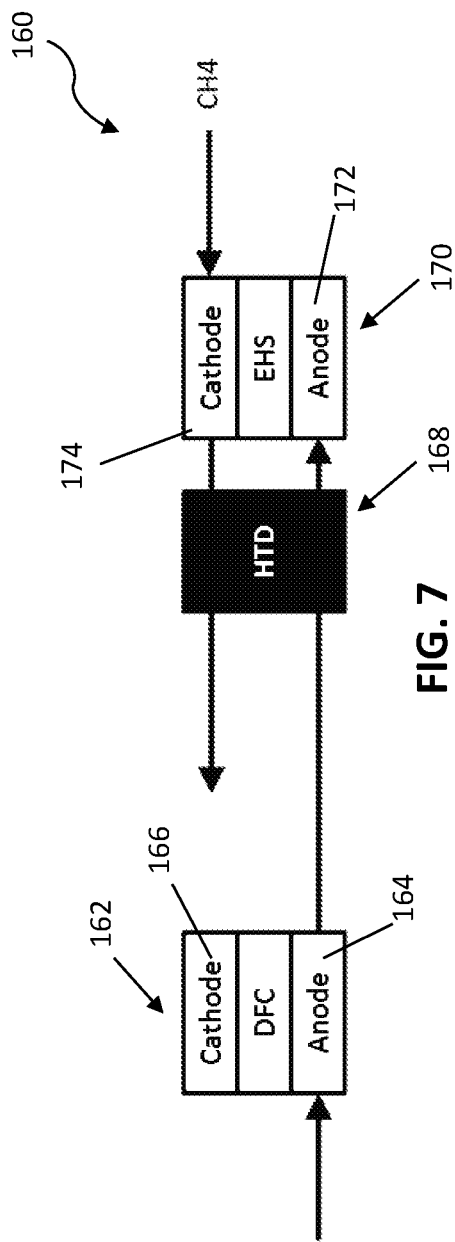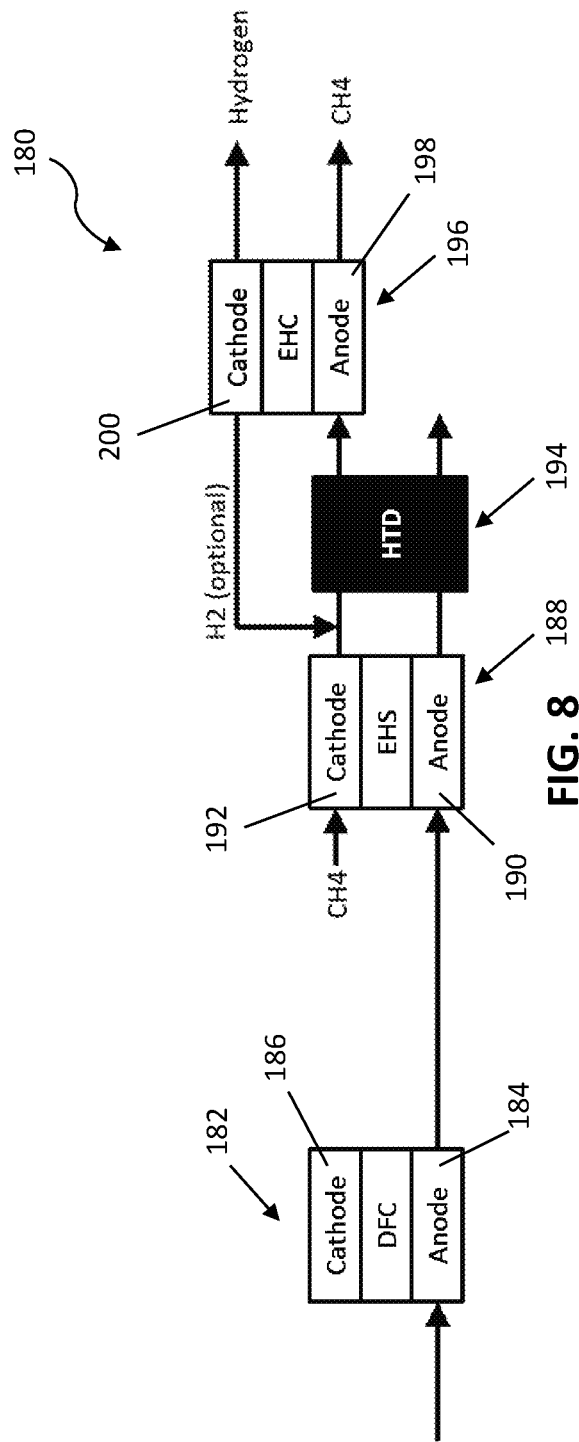

HUMIDITY TRANSFER ASSEMBLIES FOR FUEL CELLS AND HIGHER-TEMPERATURE ELECTROCHEMICAL SYSTEMS

CROSS-REFERENCE TO RELATED APPLICATIONS

This application claims the benefit of and priority to U.S. Provisional Application No. 62/725,042, filed Aug. 30, 2018, the entire disclosure of which is hereby incorporated by reference herein.

BACKGROUND

The present application relates generally to the field of humidity management systems for fuel cells and more specifically to a humidity transfer device for transferring steam between anode exhaust and fuel cell feed gas.

In a conventional fuel cell system, the fuel cell (e.g., solid oxide, molten carbonate, phosphoric acid, solid acid, etc.) generally requires receiving a feed gas with a specific and narrow range of humidity levels for proper operation of the system generally and/or the fuel cell more specifically. Further, prolonged operation of the system with a feed gas outside the desired humidity range may result in degradation of the fuel cell, thereby increasing maintenance costs and reducing the overall lifecycle of the system.

In one of these conventional systems, a separate liquid water supply from a commercial source (i.e., tap water) is used to meet humidification requirements for feed gases. Due to sensitivities of fuel cells to impurities, this water supply must be purified to protect equipment from scaling, alkalinity/acidity, conductivity of dissolved solids, and to produce high quality steam. The water is then vaporized using excess heat from system or from separate fuel combustion, which requires additional energy inputs.

During operation of a conventional fuel cell system, humidified anode exhaust is generally output from the system. In such a system, steam that has already been generated in the system is lost, reducing the overall efficiency of the system. Alternatively, in some systems, the anode exhaust may be cooled and compressed in a chiller to separate the steam as water and then the water is re-boiled for reuse as steam elsewhere in the system. However, the process of compressing and vaporizing the steam requires large energy inputs and may also reduce the overall efficiency of the system. Specifically, the equipment needed to separate water in a conventional system may include several pieces of bulky and parasitic equipment, which are prone to mechanical failure and demand frequent maintenance and repair. Further, this water recovery method generates significant quantities of discharge waste water output from the system, which not only wastes water but may require permits to operate, increasing the cost and complexity of installing and operating the system.

Accordingly, it may be advantageous to provide a fuel cell system with a humidity transfer device configured to provide feed gas with a reliable and adjustable level of humidity by recycling steam from anode exhaust.

SUMMARY

One embodiment relates to a humidity transfer assembly, including a pressure vessel and a humidity transfer device disposed in the pressure vessel. The humidity transfer device includes an enclosure, a first inlet line fluidly coupled to the enclosure and configured to supply anode exhaust thereto, a first outlet line fluidly coupled to the enclosure and configured to output anode exhaust therefrom, and a second inlet line fluidly coupled to the enclosure and configured to supply feed gas thereto. The humidity transfer device is configured to transfer steam from anode exhaust to feed gas and to output feed gas into the pressure vessel.

One aspect of the humidity transfer assembly relates to a pressure in the pressure vessel being approximately the same as a pressure of anode exhaust received in the enclosure.

Another aspect of the humidity transfer assembly relates to the enclosure being formed from plastic.

Another aspect of the humidity transfer assembly relates to water disposed in the pressure vessel and defining a water level, and a feed gas conduit extending from the enclosure and defining a conduit outlet disposed below the water level.

Another aspect of the humidity transfer assembly relates to an introduction of feed gas from the feed gas conduit into the water vaporizing a portion of the water.

Another aspect of the humidity transfer assembly relates to a water level controller configured to adjust a steam-to-carbon ratio for feed gas in the pressure vessel by controlling the water level in the pressure vessel.

Another aspect of the humidity transfer assembly relates to a feed gas outlet formed in the pressure vessel and configured to output humidified feed gas from the pressure vessel.

Another aspect of the humidity transfer assembly relates to the humidity transfer device being a shell-and-tube configuration.

Another aspect of the humidity transfer assembly relates to the humidity transfer device being a planar stack configuration.

Another aspect of the humidity transfer assembly relates to a polymer-electrolyte membrane disposed in the enclosure and separating the anode exhaust from the feed gas.

Another aspect of the humidity transfer assembly relates to the polymer-electrolyte membrane being formed from at least one of Nafion™ (e.g., sulfonate groups attached to a hydrophobic fluorocarbon backbone, $C_7HF_{13}O_5S.C_2F_4$, etc.), Aquivion® (e.g., sulfonate groups attached to a short-side-chain perfluoropolymer), or another hydrocarbon.

Another embodiment relates to a fuel cell system, including a fuel cell having an anode and a cathode and an electrochemical hydrogen separator having an anode and a cathode. The fuel cell system further includes a humidity transfer device configured to receive anode exhaust from the anode of the fuel cell and to receive cathode exhaust from the cathode of the electrochemical hydrogen separator. The humidity transfer device is configured to transfer steam from the anode exhaust to the cathode exhaust.

One aspect of the fuel cell system relates to a polymer-electrolyte membrane disposed in the humidity transfer device, the polymer-electrolyte membrane separating the cathode exhaust from the anode exhaust and passing steam therebetween.

Another aspect of the fuel cell system relates to the humidity transfer device being configured to output dehumidified anode exhaust to the anode of the electrochemical hydrogen separator.

Another embodiment relates to a fuel cell system, including an electrochemical hydrogen separator having an anode and a cathode and a humidity transfer device configured to receive anode exhaust from the anode and to receive cathode exhaust from the cathode. The humidity transfer device is configured to transfer steam from the anode exhaust to the cathode exhaust.

One aspect of the fuel cell system relates to a polymer-electrolyte membrane disposed in the humidity transfer device, the polymer-electrolyte membrane separating the cathode exhaust from the anode exhaust and passing steam therebetween.

Another aspect of the fuel cell system relates to a fuel cell having an anode and a cathode. The anode of the electrochemical hydrogen separator is configured to receive anode exhaust from the anode of the fuel cell.

Another aspect of the fuel cell system relates to an electrochemical hydrogen compressor having an anode and a cathode. The anode of the electrochemical hydrogen compressor is configured to receive humidified cathode exhaust from the humidity transfer device.

Another aspect of the fuel cell system relates to the cathode of the electrochemical hydrogen compressor being configured to output hydrogen. At least a portion of the hydrogen is mixed with the cathode exhaust output from the cathode of the electrochemical hydrogen separator.

Another aspect of the fuel cell system relates to the hydrogen being mixed with the cathode exhaust upstream from the humidity transfer device.

BRIEF DESCRIPTION OF THE DRAWINGS

FIG. 7 is a schematic view of a fuel cell system with a single-stage vapor phase steam transfer, according to an exemplary embodiment.

FIG. 8 is a schematic view of a fuel cell system with a two-stage vapor phase steam transfer, according to an exemplary embodiment.

DETAILED DESCRIPTION

In order to operate a fuel cell system, feed gas (i.e., feedstock) may be mixed with steam to form a humidified fuel. This humidified fuel may then be fed to an anode or a cathode of a fuel cell in the system for reaction in the fuel cell. The humidification of feed gas may require a device for transferring steam from another stream or supply to the feed gas. For example, as shown in the FIGURES, a humidity transfer device is shown according to various exemplary embodiments to transfer steam from anode exhaust to the feed gas for the fuel cell system. As will be discussed in further detail below, the anode exhaust may already humidified (e.g., mixed with steam) before the anode exhaust is introduced to the humidity transfer device. In contrast, prior to being introduced to the humidity transfer device, the feed gas either is not mixed with steam or is not mixed with enough steam for proper reaction in the system. The transfer of steam in the humidity transfer device from the anode exhaust to the feed gas reuses steam that would otherwise be output as waste from the system, thereby reducing or eliminating the need to separately generate steam to mix with and humidify the feed gas.

As described in this application, the humidity transfer device is a solid-state device configured to be incorporated into various electrochemical systems for steam and water management, recovery, and recycling. For example, the humidity transfer device may be incorporated into fuel cell systems that include chemical reactions involving steam (e.g., a steam-methane reformer ("SMR")), and higher-temperature fuel cells (e.g., molten carbonate, polybenzimidazole, solid acid, solid oxide, or phosphoric acid, etc.) operating either as a conventional fuel cell or in an electrolysis mode. These fuel cells may include proton-conducting, carbonate ion-conducting, oxide ion-conducting, hydroxide ion-conducting, and mixed ion-conducting fuel cells or combinations of different types of fuel cells in a single system.

Figure 1:
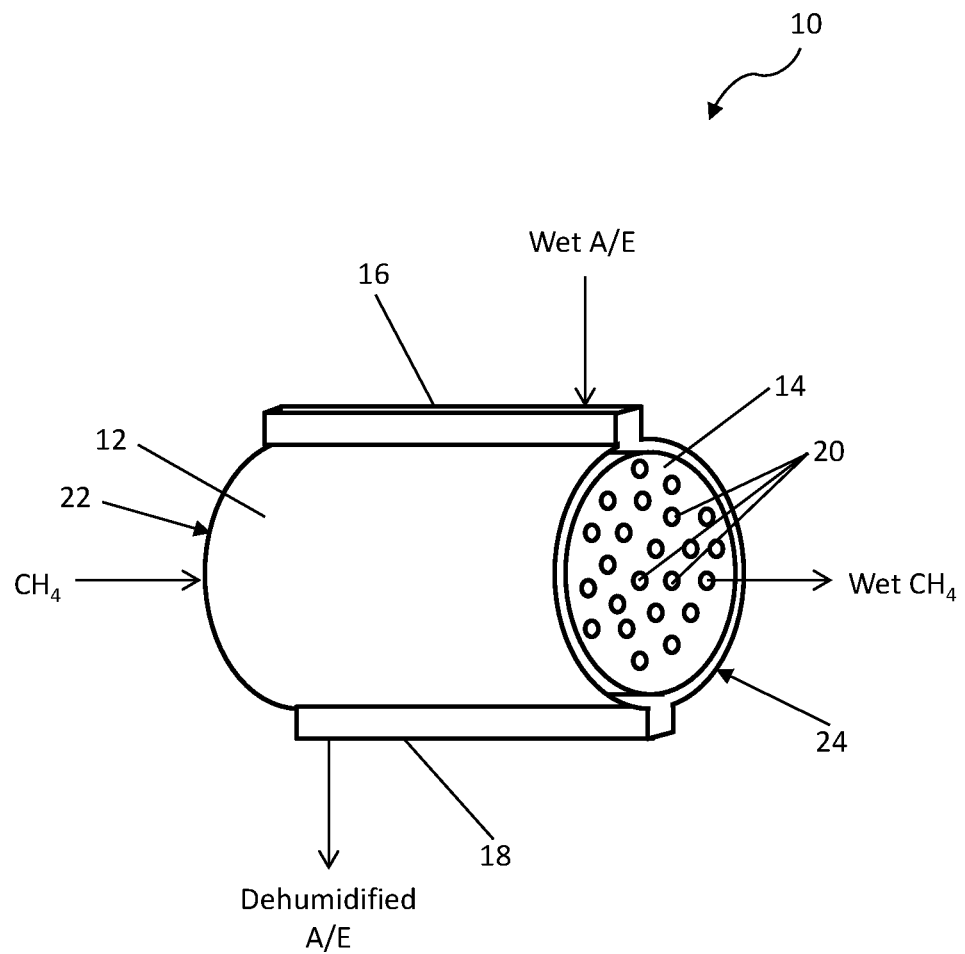
FIG. 1 shows a humidity transfer device with a shell-and-tube configuration, according to an exemplary embodiment.

Referring to FIG. 1, a humidity transfer device ("HTD") 10 is shown according to an exemplary embodiment. The HTD 10 includes a shell-and-tube configuration including a shell 12 disposed annularly about a membrane 14. A gap (i.e., a space) is defined between the shell 12 and the membrane 14 such that during operation of the HTD 10, anode exhaust passes between the shell 12 and the membrane 14. It should be understood that while FIG. 1 shows the shell 12 and the membrane 14 having generally cylindrical shapes, the shell 12 and the membrane 14 may define other shapes, such that the shell 12 is disposed about the membrane 14. The shell 12 may be formed from plastic or other suitable material and is configured to fully enclose the membrane 14 therein. The shell 12 defines a shell inlet 16 (i.e., a shell inlet baffle) configured to receive and feed humidified anode exhaust to an interior portion of the shell 12. It should be understood that humidified anode exhaust refers to a mixture of anode exhaust and steam. Steam is transferred through the membrane 14 to feed gas, as will be described in further detail below, until substantially all of the steam is separated from the anode exhaust, forming a dry anode exhaust. The shell 12 further defines a shell outlet 18 (i.e., a shell outlet baffle) opposing the shell inlet 16 and configured to output the dry anode exhaust from the shell 12.

Referring still to FIG. 1, the membrane 14 is a polymer-electrolyte membrane ("PEM"), which is configured to transfer steam therethrough without passing anode exhaust or feed gas (e.g., natural gas) therethrough. The membrane 14 may be formed from materials, such as Nafion™, Aquivion®, or various hydrocarbons. For use with higher-temperature fuel cells, it may be advantageous to provide a membrane 14 formed from a material rated to withstand an anticipated operational temperature of the fuel cell. In the configuration shown in FIG. 1, anode exhaust and feed gas may separately flow through the HTD 10 for transferring steam from the anode exhaust to the feed gas without mixing the two streams. The membrane 14 defines at least one passage 20 (i.e., channel, opening, tube, etc.) extending from an inlet end 22 to an outlet end 24 of the membrane 14. While FIG. 1 shows the inlet end 22 and the outlet end 24 to be at opposing ends of the membrane 14, it should be understood that the inlet and outlet ends 22, 24 may be positioned at other locations in the HTD 10, such that the at least one passage 20 remains fluidly separated from direct contact with the shell 12.

As shown in FIG. 1, the at least one passage 20 includes a plurality of passages 20 extending between the inlet and outlet ends 22, 24. According to an exemplary embodiment, the plurality of passages 20 may be defined in the membrane 14 in a parallel arrangement, such that each of the plurality of passages 20 begins at the inlet end 22 and ends at the outlet end 24. According to another exemplary embodiment, the plurality of passages 20 may be defined in the membrane 14 in a series arrangement, such that each of the passages 20 defines a pass, forming a generally serpentine arrangement.

While FIG. 1 shows anode exhaust passing between the shell 12 and the membrane 14 (e.g., external to the membrane 14) and feed gas passing through the passages 20, it should be understood that the HTD 10 may be configured such that feed gas passes between the shell 12 and the membrane 14 and the anode exhaust passes through the passages 20. According to another exemplary embodiment, the passages 20 may be formed in a parallel configuration, such that a first plurality of the passages 20 are fluidly separated from a second plurality of the passages 20. In this configuration anode exhaust passes through the first plurality of passages 20 and feed gas passes through the second plurality of passages 20, such that steam is transferred through the membrane 14 between each of the first and second pluralities of passages 20.

Figure 2:
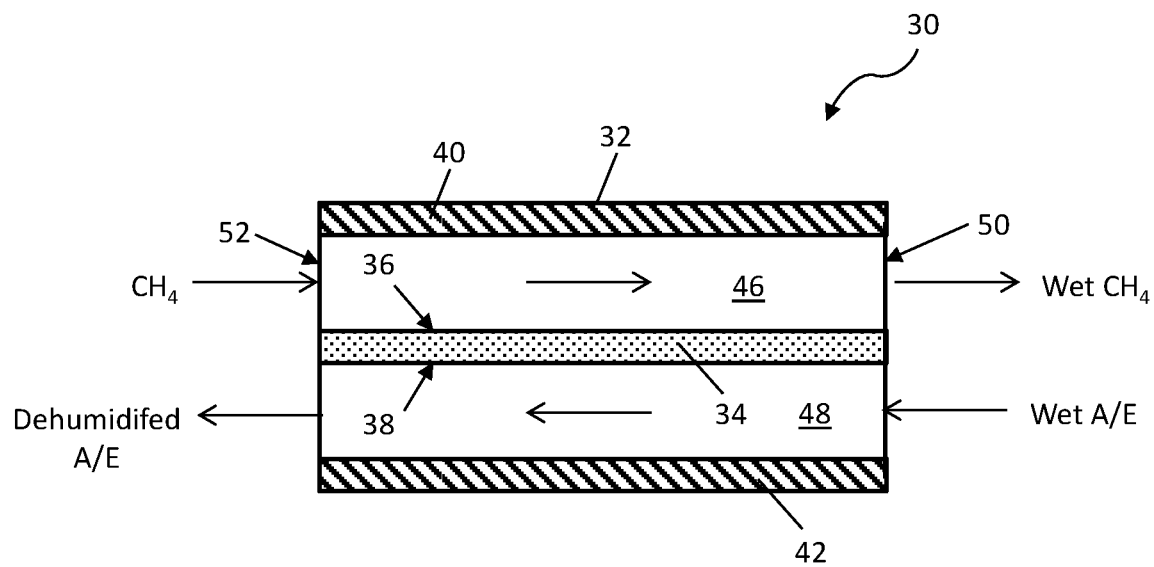
FIG. 2 shows a cross-sectional view of a humidity transfer device with a planar stack configuration, according to an exemplary embodiment.

Referring now to FIG. 2, an HTD 30 is shown according to another exemplary embodiment and operates in a substantially similar way as the HTD 10. The HTD 30 includes a planar stack configuration. The HTD 30 defines an enclosure 32 (i.e., shell) and a substantially planar membrane 34 disposed within the enclosure 32. The membrane 34 is a polymer-electrolyte membrane substantially the same as the membrane 14 described with respect to FIG. 1. The membrane 34 defines an upper surface 36 and an opposing lower surface 38. The enclosure 32 includes a top wall 40 proximate and spaced apart from the upper surface 36 of the membrane 34. Similarly, the enclosure 32 includes a bottom wall 42 opposing the top wall 40, the bottom wall 42 being proximate and spaced apart from the lower surface 38 of the membrane 34. The top wall 40, bottom wall 42, and membrane 34 may all be substantially parallel, although they may define other orientations according to other exemplary embodiments.

Figure 3:
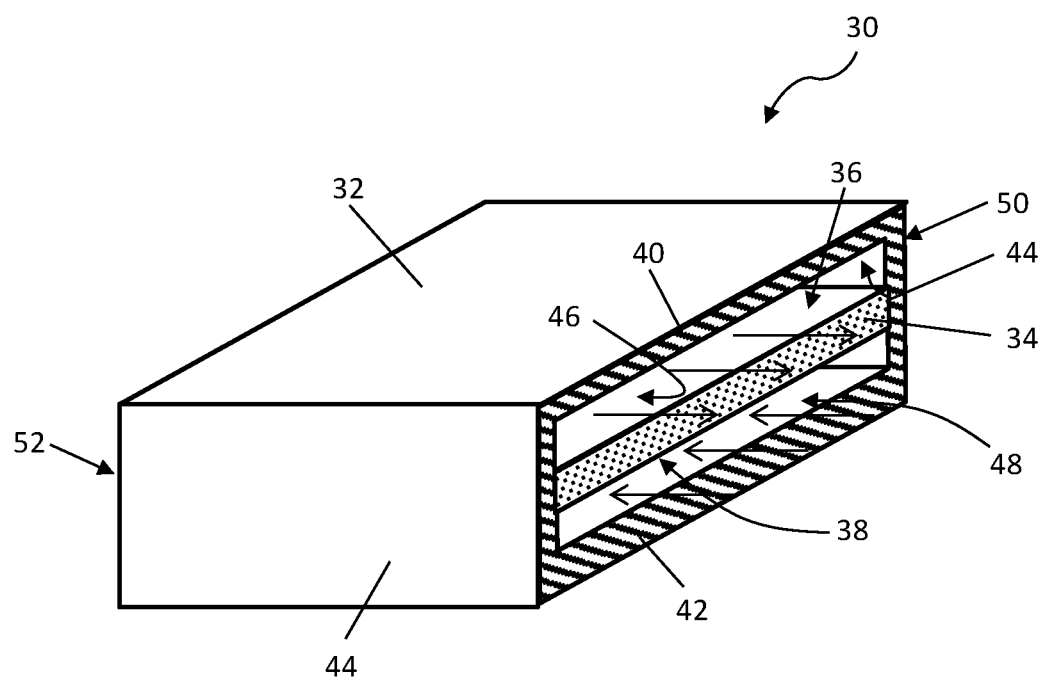
FIG. 3 shows a perspective view of the humidity transfer device of FIG. 2.

Referring now to FIG. 3, the enclosure 32 further includes opposing side walls 44 extending between the top wall 40 and the bottom wall 42. As shown in FIGS. 2 and 3, a first passage 46 is defined between the membrane 34 and the top wall 40 and is configured to receive anode exhaust passing therethrough. Similarly, a second passage 48 is defined between the membrane 34 and the bottom wall 42 and is configured to receive feed gas passing therethrough. As shown in FIG. 3, the membrane 34 extends completely between the side walls 44, fluidly separating the anode exhaust in the first passage 46 from the feed gas in the second passage 48. Similarly as described above with respect to FIG. 1, in the HTD 30, steam passes through the membrane 34 from the anode exhaust to the feed gas, while the anode exhaust and the feed gas remain separated.

While FIGS. 2 and 3 show an enclosure 32 having only one membrane 34 and two passages 46, 48, it should be understood that the enclosure 32 may include more than one membrane 34 disposed in a parallel stack within the enclosure 32, such that additional passages are defined between each of the adjacent membranes 34. The passages may alternate between passing anode exhaust and feed gas, such that each membrane 34 engages one of anode exhaust or feed gas on its upper surface 36 and engages the other of anode exhaust or feed gas on its lower surface 38.

Referring again to FIG. 2, the enclosure 32 defines a first end 50 and a second end 52. As shown in FIG. 2, the anode exhaust may define a stream flowing from the first end 50 to the second end 52 and the feed gas may define a stream flowing in an opposing direction, from the second end 52 to the first end 50. According to other exemplary embodiments, the streams may flow in the same direction or the feed gas stream may flow orthogonally to the anode exhaust stream. While FIGS. 1-3 show feed gas and anode exhaust passing through an HTD 10, 30 for steam transfer, it should be understood that other streams may be passed through the HTD 10, 30. For example, such streams may include cathode exhaust, anode feed gas, cathode feed gas, etc.

As discussed above, a humidification process occurs in the HTD 10, 30 as steam is transferred from the anode exhaust to the feed gas. The amount of steam mixed with the feed gas is defined as a steam-to-carbon ratio ("S/C ratio"), measuring the molecular ratio of steam ($H_2O$) relative to carbon in the feed gas (e.g., $CH_4$). During the humidification process, the S/C ratio increases as more steam is introduced to and mixed with the feed gas. For example, the volume flow rate of anode exhaust fed to the HTD 10, 30 may be increased to achieve a desired S/C ratio of the feed gas. Similarly, the humidity and therefore the S/C ratio of the anode exhaust may be increased prior to passing through the HTD 10, 30. According to another exemplary embodiment, steam may be mixed directly with the feed gas apart from the anode exhaust to directly increase the S/C ratio of the feed gas.

Steam may continue to be introduced to and mixed with the feed gas until the S/C ratio reaches a desired level, preferably within a range for proper operation of the fuel cell system (e.g., with a S/C ratio between 1:1 and 5:1). While the feed gas may be mixed with steam for humidification, according to other exemplary embodiments, the feed gas may be mixed with liquid water and the mixture of feed gas and water is heated until at least a portion of the water shifts to steam. The feed gas and water mixture may be heated until a sufficient amount of steam is generated to provide a humidified fuel with the desired S/C ratio.

Figure 4:
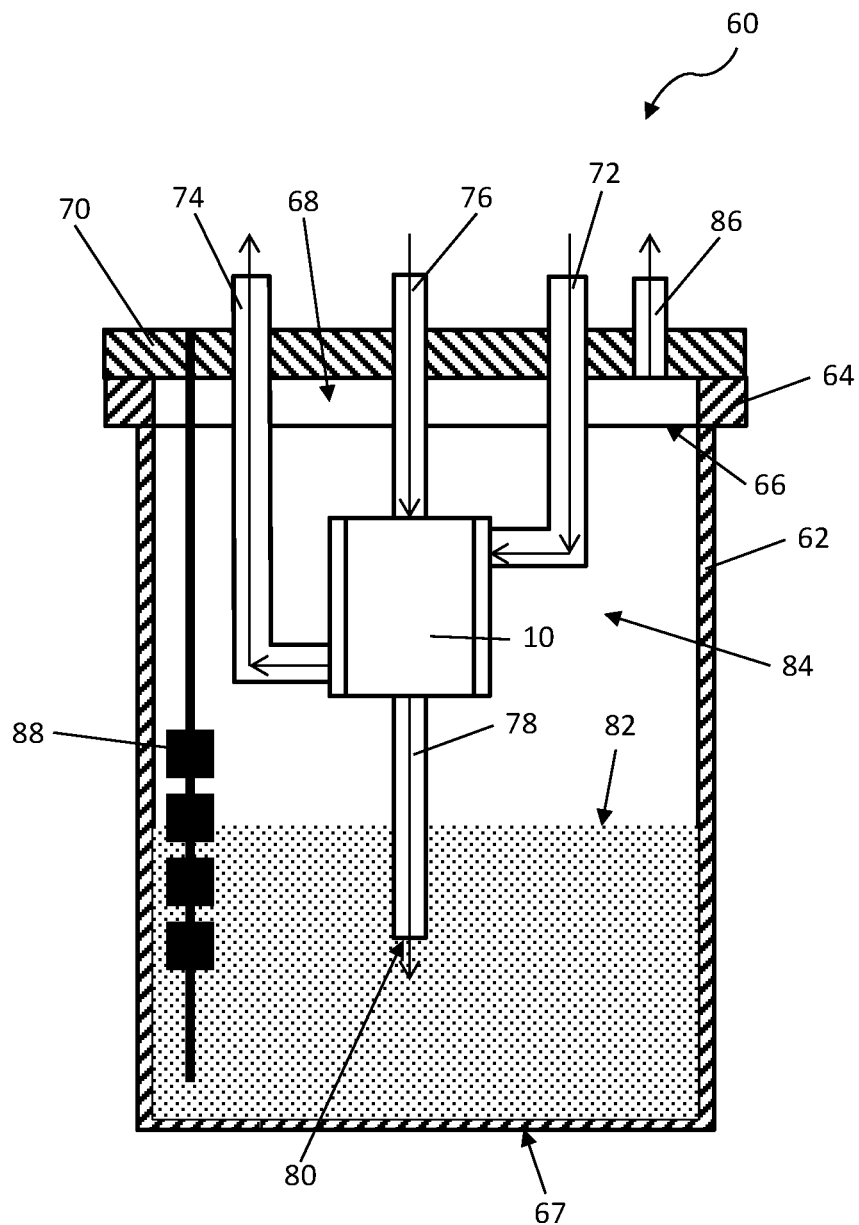
FIG. 4 shows a schematic of a pressure vessel assembly containing a humidity transfer device, according to an exemplary embodiment.

Referring now to FIG. 4, a pressure vessel assembly 60 is shown with an HTD 10 disposed therein, according to an exemplary embodiment. As shown in FIG. 4, the HTD 10 is a shell-and-tube configuration similar to the HTD 10 shown in FIG. 1. However, it should be understood that other HTDs (e.g., the HTD 30 shown in FIGS. 2 and 3) may be used in the pressure vessel assembly 60 instead of or in addition to the HTD 10 as shown in FIG. 4. The pressure vessel assembly 60 includes a pressure vessel 62 that is generally hollow and defines a flange 64 extending laterally outward from an upper end 66 of the vessel 62 and an opening 68 formed at the upper end 66. The pressure vessel assembly 60 further includes a lid 70 (i.e., cap) which is disposed on the vessel 62 at the upper end 66 and coupled to the flange 64 to secure the lid 70 in place on the vessel 62. When the lid 70 is secured in place, the lid 70 sealingly engages the flange 64 and fully encloses the vessel 62, such that the pressure vessel assembly 60 may be pressurized.

The HTD 10 may receive pressurized streams of gas. For example, the anode exhaust may be provided at approximately 70 psi. In an unpressurized setting, the HTD 10 may not be able to withstand high-pressure anode exhaust passing therethrough without causing damage to the HTD 10. For example, if the shell 12 or enclosure 32 is formed from plastic, the pressure differential between the anode exhaust passing through the HTD 10 and the environment external to the HTD 10 may cause the shell 12 or enclosure 32 to rupture and leak anode exhaust. However, in the configuration shown in FIG. 4, the pressure vessel assembly 60 may be pressurized, such that the pressure inside the vessel 62 is close to the pressure of the anode exhaust, or within a pressure differential that will not cause damage to the HTD 10. Advantageously, by pressurizing the pressure vessel assembly 60, the shell 12 or enclosure 32 may be formed from less expensive and less resilient materials, thereby reducing the cost of the HTD 10.

Referring still to FIG. 4, the pressure vessel assembly 60 includes a first inlet line 72 (i.e., conduit, passage, etc.) and a first outlet line 74 (i.e., conduit, passage, etc.) extending through the lid 70. The first inlet line 72 is configured to transfer a stream (e.g., anode exhaust) from outside the pressure vessel assembly 60 to the HTD 10. After steam is transferred in the HTD 10, the first outlet line 74 is configured to transfer dry anode exhaust from the HTD 10 out of the pressure vessel assembly 60 for use elsewhere in the fuel cell system or export from the system. While FIG. 4 shows the first inlet line 72 (i.e., anode exhaust inlet line) and the first outlet line 74 (i.e., anode exhaust outlet line) extending through the lid 70, it should be understood that the first inlet line 72 and/or the first outlet line 74 may extend through the vessel 62 instead.

The pressure vessel assembly 60 further includes a second inlet line 76 (i.e., feed gas inlet line) extending through the lid 70. The second inlet line 76 is configured to pass feed gas from a fuel supply to the HTD 10 for steam transfer, as described above, forming a partially-humidified feed gas (i.e., humidified feed gas). The partially-humidified feed gas is then output from the HTD 10 and into the vessel 62. Water is provided to the vessel 62 for further mixing with the partially-humidified feed gas to form a humidified feed gas with a desired S/C ratio for use in a fuel cell system. The partially-humidified feed gas may be output from the HTD 10 from an opening in the HTD 10 or through a feed gas conduit 78. For example, the feed gas conduit 78 may extend generally downward from the HTD 10 toward a lower end 67 of the vessel 62 toward the water. As shown in FIG. 4, the feed gas conduit 78 defines a conduit outlet 80 disposed below a water level 82, although the conduit outlet 80 may be disposed above the water level 82 or in a pressure vessel 60 without water present according to other exemplary embodiments. When the conduit outlet 80 is disposed below the water level 82, the injection of the partially-humidified feed gas generates gas pockets in the water and forms bubbles. The bubbling process may vaporize additional water into steam, increasing the S/C ratio of the feed gas mixed with the bubbled water.

The partially-humidified feed gas then passes from the HTD 10 or the feed gas conduit 78 into a mixing portion 84 of the vessel 62, defined between the water level 82 and the lid 70. As the partially-humidified feed gas passes through the mixing portion 84, steam present in mixing portion 84 mixes with the partially-humidified feed gas, further increasing the S/C ratio to a desired level and forming a humidified feed gas. The humidified feed gas is then passed through a feed gas outlet 86 extending through the lid 70 for use in a fuel cell. According to other exemplary embodiments, the feed gas outlet 86 may extend through the vessel 62. In either configuration, the feed gas outlet 86 may be disposed proximate the upper end 66 of the vessel 62 as the humidified feed gas has a high temperature and therefore rises in the vessel 62. While FIG. 4 shows the partially-humidified feed gas passing through the mixing portion 84, according to another exemplary embodiment, the HTD 10 may be connected directly to the feed gas outlet 86, such that steam is only transferred to the feed gas within the HTD 10 and not at other portions of the pressure vessel assembly 60. In such a configuration, the vessel 62 may not be filled with water for generating additional steam.

As discussed above, it may be important to closely control the S/C ratio of the feed gas in the fuel cell system. However systems for controlling the S/C ratio in humidified feed gas often have a difficult time adjusting for changing humidification needs and increase the complexity of the control system in charge of operating the fuel cell system. For example, the required S/C ratio may change over the lifetime of the fuel cell system. Specifically, degradation of the fuel cell system over time may result in a need to increase or decrease the humidity level of the humidified fuel received at the fuel cell to compensate for these changes. According to another exemplary embodiment, different compositions of feed gas (e.g., natural gas, ADG, etc.) may require different S/C ratios for operation in a given fuel cell. If a fuel cell system is configured to operate with more than one composition of feed gas (either separately or mixed together), the system may require being able to generate a humidified feed gas with different S/C ratios based on the feed gas being supplied.

Referring still to FIG. 4, the pressure vessel assembly 60 includes a water controller 88 disposed within and extending generally vertically in the vessel 62. The water controller 88 measures the water level 82 in the vessel 62. The percentage humidity in the mixing portion 84 of the vessel 62 may be determined based on the measured water level 82. For example, if the water level 82 is measured before the water in the vessel 62 is heated, the amount of steam in the mixing portion 84 may be determined based on the drop in the water level 82 once the system is fully operating. According to another exemplary embodiment, the water controller 88 may directly measure the S/C ratio in the mixing portion 84 by measuring relative humidity above the water level 82.

The water controller 88 may further include a heating element configured to heat the water in the vessel 62 to vaporize at least a portion of the water for generating steam in mixing portion 84 of the vessel 62. According to another exemplary embodiment, the vessel 62 may be externally heated or heat may be transferred to the water in other ways to generate steam in the mixing portion 84. The water controller 88 may further control the introduction of water from a water supply (e.g., tap) or other water source in the fuel cell system in order to provide makeup water if the water level 82 begins to drop. According to an exemplary embodiment, the water controller 88 may be automated to increase the steam generated until the S/C ratio in the humidified feed gas reaches a desired level for use in a specific fuel cell. For example, the water controller 88 may automatically adjust the humidity based on how long the fuel cell system has been operating to compensate for degradation of the system. Similarly, the water controller 88 may be automated to adjust the humidity in the mixing portion 84 based on a data input of a fuel type into the water controller 88.

Figure 5:
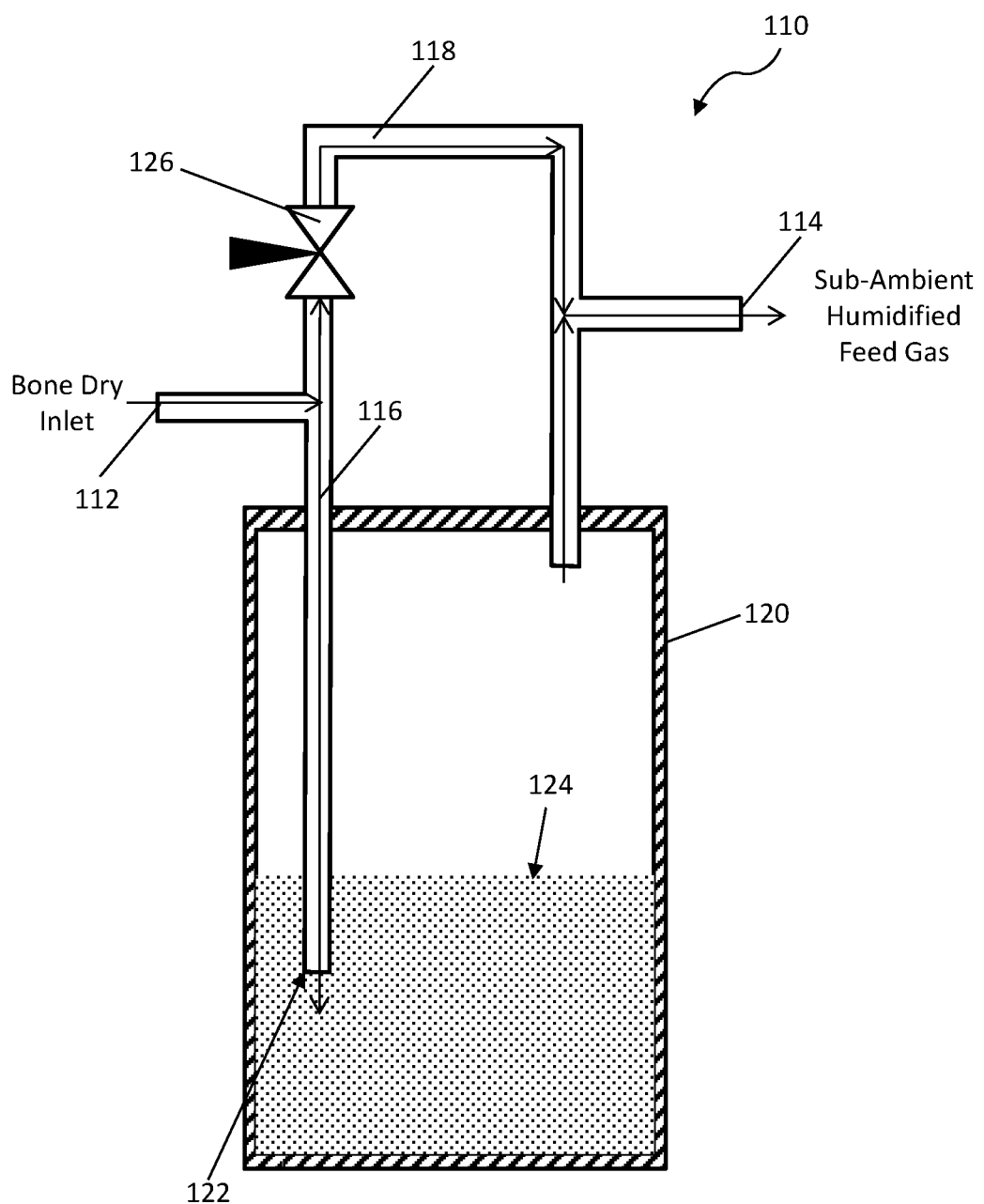
FIG. 5 shows a schematic of a humidity transfer device, according to another exemplary embodiment.

Referring now to FIG. 5, an HTD 110 is shown according to another exemplary embodiment. As will be discussed in further detail below, the HTD 110 is configured to provide feed gas at a sub-ambient humidification condition. During operation of a fuel cell, the feed gas to one or both of the anode or the cathode may be humidified with an HTD. It was found that the optimal dew point at the anode inlet is substantially lower than the corresponding dew point at the cathode inlet. For example, the anode inlet may have a dew point between approximately 10 and 20° C. and more particularly between approximately 15 and 20° C. At the dew point, the feed gas is fully humidified (i.e., saturated).

With respect to the cathode, it was found that the cathode inlet had a dew point of greater than approximately 35° C. In this configuration, in order to achieve the same level of humidification of the feed gas in the cathode as in the anode, the feed gas and required water for the cathode must be heated to a much higher temperature than at the anode, which increases the energy required to complete the humidification process. With the lower dew point in the anode, it becomes important to precisely control the level of humidification in the feed gas. For example, too much humidity can lead to condensation forming in the feed gas, which can damage the fuel cell.

Referring still to FIG. 5, the HTD 110 includes an inlet 112 configured to receive feed gas from a feed gas source and an outlet 114 downstream from the inlet 112 and configured to output humidified feed gas therefrom. Downstream from the inlet 112, the feed gas is split into a first conduit 116 and a second (i.e., bypass) conduit 118. The first conduit 116 receives a first portion of the feed gas and passes the first portion to a vessel 120 filled at least partially with water. Specifically, the first conduit 116 defines a conduit outlet 122 disposed below a water level 124, although the conduit outlet 122 may be disposed above the water level 124. When the conduit outlet 122 is disposed below the water level 124 or the feed gas is output from the conduit outlet 122 proximate the water, the injection of the feed gas generates gas pockets in the water and forms bubbles. The bubbling process may vaporize additional water into steam, increasing the S/C ratio of the feed gas mixed with the bubbled water, even if the temperature of the feed gas is below the water vaporization temperature for the pressure level within the vessel 120. A humidified first portion of feed gas is then output from the vessel 120 directly to the outlet 114.

A second portion (i.e., a bypass portion) of the feed gas passes from the inlet 112 through the second conduit 118 and to the outlet 114. The second portion of the feed gas maintains the same level of humidification as the feed gas first received at the inlet 112. Prior to being output from the outlet 114, the humidified first portion of feed gas is mixed with the second portion of feed gas, such that the final mixture is at a sub-ambient level of humidification. A valve 126 (e.g., a needle valve) is disposed in the second conduit 118 and is configured to control the amount of feed gas that passes through each of the first and second conduits 116, 118. For example, when the valve 126 is closed, all of the feed gas passes through the first conduit 116 and to the vessel 120, where it is humidified. As the valve 126 is opened, feed gas begins to divert to the second conduit 118. In particular, because the conduit outlet 122 is disposed below the water level 124, the pressure at the conduit outlet 122 is greater than in the second conduit 118, which forces the feed gas through the second conduit 118 rather than the first conduit. If the valve 126 is fully opened, substantially all of the feed gas would pass through the second conduit 118, bypassing the first conduit 116 and vessel 120, and the humidification level of the feed gas would remain unchanged. This configuration may be used when the feed gas supplied to the HTD 110 is already fully humidified. The valve 126 may be manually controlled or automatically controlled based on a humidification level measured at the outlet 114 or elsewhere in the HTD 110.

Figure 6:
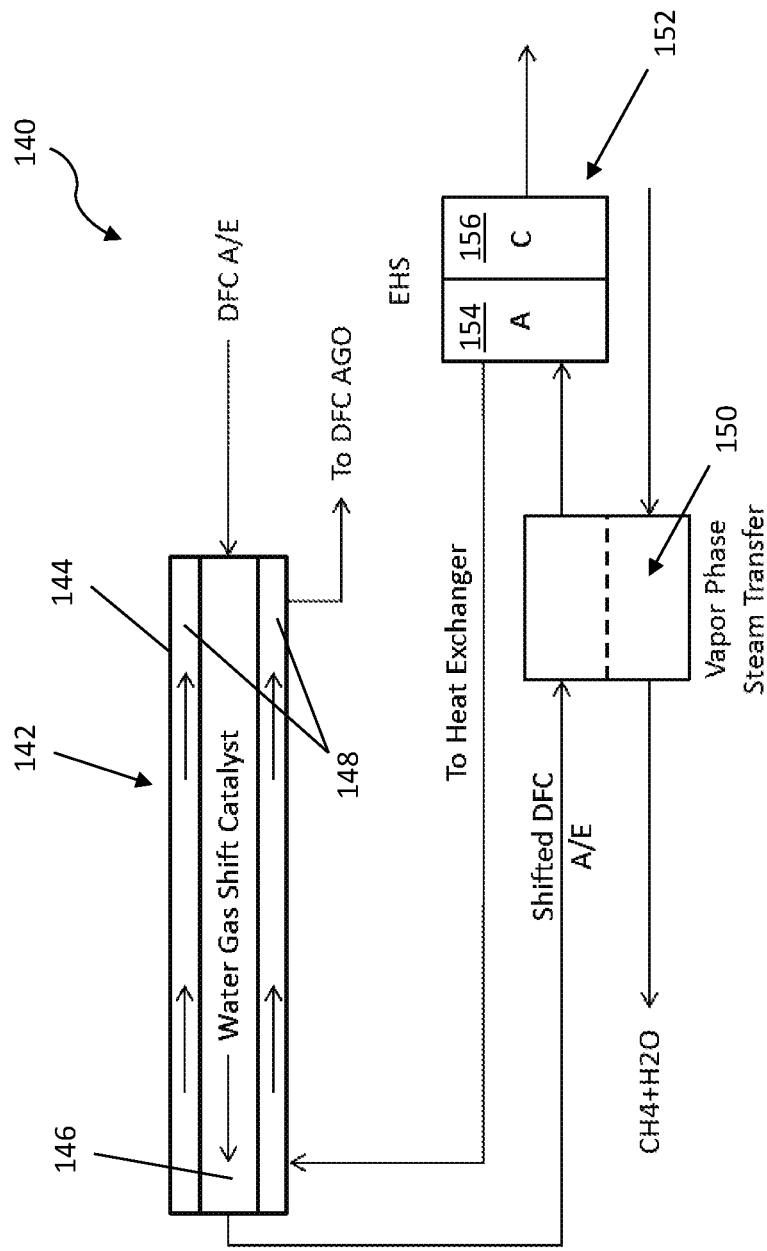
FIG. 6 is a schematic view of a fuel cell system incorporating vapor phase steam transfer, according to an exemplary embodiment.

Referring now to FIGS. 6-8, fuel cell systems incorporating an HTD for water recovery are shown according to various exemplary embodiments. It should be understood that a power plant may require a supply of high quality steam, such that the steam is substantially free from dissolved solids, chlorides, or other ions. Notably, the proliferation of these impurities in a fuel cell system may lead to degradation of the fuel cell system over the course of its service life. In order to remove the impurities, a power plant generally requires a supply of deionized water for high-quality steam generation. The deionization process often also requires the fuel cell system to include additional water purification equipment, which increase the capital investment in the overall fuel cell system as well as annual operating and maintenance costs. For example, conventional water purification systems may lead to higher operational costs because they generally require a high heat level. Furthermore, conventional water purification systems have a high rate of failure, leading to higher maintenance and replacement costs.

Conventional water management systems, which may include water purification systems, are large in size, and therefore add to the overall space required for installation of a fuel cell system. Specifically, the use of water management systems limits the locations that the fuel cell system can be installed due to the size requirements as well as a need for access to a water source. Furthermore, the conventional water management systems may have substantial carbon emissions as an output, which may limit installation of the fuel cell system based on local emissions standards. The use of these systems may also reduce operational efficiency for the fuel cell system because all of the additional required equipment (e.g., pumps, heaters, heat tracing, etc.) draw power and heat from the fuel cell system, resulting in substantial parasitic losses.

Use of conventional water management systems also often result in product gases from the fuel cell system that are wet (i.e., have a humidity level that is higher than a desired level), forming condensation. In this situation, the product gases may require drying, resulting in additional waste water output from the fuel cell system that needs to be recovered. This necessary waste water recovery may further increase the operational costs, for example, associated with removing water from the product gas as well as the capital costs for the fuel cell system to install the additional components required for drying the product gas. By using water recovery with an HTD, as shown in the systems in FIGS. 6-8, the costs associated with the water purification is reduced and/or eliminated as already-deionized water can then be reused in other portions of the system.

Referring to FIG. 6, a fuel cell system 140 is shown according to an exemplary embodiment. The system 140 includes a shift reactor 142 includes a shell 144 and a water-gas shift catalyst 146 disposed in the shell 144. At least one passage 148 is formed between the shift catalyst 146 and the shell 144. Anode exhaust from a fuel cell (e.g., a direct reforming fuel cell ("DFC")) is fed through the shift catalyst 146 and reformed through a water-gas shift reaction in the shift catalyst 146. The shifted anode exhaust is then output from the shift reactor 142. It should be understood that while FIG. 6 shows the system 140 with a shift reactor 142, according to other exemplary embodiments, the system 140 may include a methanator in addition to or in place of the shift reactor 142.

Due to the water-gas shift reaction, which adds water to the DFC anode exhaust in the shift catalyst 146, the shifted anode exhaust may be wet (e.g., fully or oversaturated) and require the transfer of water out from the anode feed gas before being introduced to another fuel cell. As shown in FIG. 6, the shifted anode exhaust is fed through an HTD 150. The HTD 150 may be substantially the same as any of the HTDs 10, 30, 110 discussed above in this application or any other suitable HTD. In the HTD 150, water is transferred from the shifted anode exhaust to feed gas also passing through the HTD 150, such that the HTD 150 outputs a dehumidified anode exhaust.

The system 140 includes an electrochemical hydrogen separator ("EHS") 152, which is a fuel cell operating in reverse to generate hydrogen. The EHS 152 includes an anode 154 and a cathode 156. The anode 154 is configured to electrochemically react the dehumidified anode exhaust from the HTD 150 and output purified hydrogen from the cathode 156. The anode 154 then outputs EHS anode exhaust, which is fed back to the shift reactor 142. Specifically, the EHS anode exhaust is fed through the at least one passage 148 in the shift reactor 142 and reacts with the shift catalyst 146 to reform. The EHS anode exhaust may then output to an anode gas oxidizer (not shown) or elsewhere in the system 140 for use in the DFC or other fuel cell. In FIG. 6, the EHS anode exhaust and the DFC anode exhaust are shown passing through the shift reactor 142 in opposing directions. However, it should be understood that the EHS anode exhaust and the DFC anode exhaust may pass through the shift reactor 142 in other directions relative to each other.

Referring to FIG. 7, a fuel cell system 160 is shown according to an exemplary embodiment. The system 160 is a single-stage system, which takes exhaust gas directly from a DFC or other fuel cell for humidity transfer. For example, the system 160 includes a DFC 162 having an anode 164 and a cathode 166. The anode 164 receives anode feed gas, reacts the anode feed gas, and outputs DFC anode exhaust. The DFC anode exhaust is then fed to an HTD 168. The system 160 further includes an EHS 170 having an anode 172 and a cathode 174. The cathode 174 receives and reacts feed gas and outputs EHS cathode exhaust. The EHS cathode exhaust is then fed to the HTD 168. The HTD 168 may be substantially the same as any of the HTDs 10, 30, 110 discussed above in this application or any other suitable HTD. In the HTD 168, water is transferred from the DFC anode exhaust to the EHS cathode exhaust in order to dehumidify the DFC anode exhaust. The dehumidified anode exhaust is then fed to the anode 172 of the EHS 170 for reaction.

Referring to FIG. 8, a fuel cell system 180 is shown according to an exemplary embodiment. The system 180 is a dual-stage system, which takes exhaust gas from a DFC or other fuel cell, through an EHS, for humidity transfer. For example, the system 180 includes a DFC 182 having an anode 184 and a cathode 186. The anode 184 receives anode feed gas, reacts the anode feed gas, and outputs DFC anode exhaust. The system 180 further includes a EHS 188, having an anode 190 and a cathode 192. The DFC anode exhaust is fed, with or without being processed, to the anode 190 of the EHS 188, where it is reacted and forms EHS anode exhaust. The EHS anode exhaust is then fed to an HTD 194. The HTD 194 may be substantially the same as any of the HTDs 10, 30, 110 discussed above in this application or any other suitable HTD. The cathode 192 of the EHS 188 receives feed gas, which is reacted in the cathode 192. The cathode 192 then outputs EHS cathode exhaust, which is fed to the HTD 194. In the HTD 194, water is transferred from the EHS anode exhaust to the EHS cathode exhaust, lowering the humidification level of the EHS anode exhaust. Dehumidified anode exhaust and wet cathode exhaust are then separately output from the HTD 194.

Referring still to FIG. 8, the fuel cell system 180 includes an electrochemical hydrogen condenser ("EHC") 196 having an anode 198 and a cathode 200. The anode 198 receives and reacts the wet cathode exhaust from the HTD 194 and the cathode 200 condenses and outputs hydrogen. The hydrogen may be exported from or stored or used elsewhere in the system 180. According to an exemplary embodiment, at least a portion of the hydrogen compressed by the cathode 200 may be mixed with the EHS cathode exhaust before it is fed to the anode 198 of the EHC 196. FIG. 8 shows the hydrogen being mixed with the EHS cathode exhaust upstream from the HTD 194, but it should be understood that according to other exemplary embodiments, the hydrogen may be mixed with the wet cathode exhaust downstream from the HTD 194 before being fed to the anode 198 of the EHC 196.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, structures, shapes and proportions of the various elements, values of parameters, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A humidity transfer assembly comprising:
a pressure vessel; and
a humidity transfer device disposed in the pressure vessel, the humidity transfer device comprising:
an enclosure;
a first inlet line fluidly coupled to the enclosure and configured to supply anode exhaust thereto;
a first outlet line fluidly coupled to the enclosure and configured to output the anode exhaust therefrom; and
a second inlet line fluidly coupled to the enclosure and configured to supply feed gas thereto;
wherein the humidity transfer device is configured to transfer steam from the anode exhaust to the feed gas to produce partially-humidified feed gas, and to output the partially-humidified feed gas into the pressure vessel, and
wherein the pressure vessel is configured to be pressurized with the partially-humidified feed gas.

2. The humidity transfer assembly of claim 1, further comprising a feed gas outlet formed in the pressure vessel and configured to output humidified feed gas from the pressure vessel.

3. The humidity transfer assembly of claim 1, wherein the humidity transfer device is a shell-and-tube configuration.

4. The humidity transfer assembly of claim 1, wherein the humidity transfer device is a planar stack configuration.

5. The humidity transfer assembly of claim 1, wherein a pressure in the pressure vessel is approximately the same as a pressure of the anode exhaust received in the enclosure.

6. The humidity transfer assembly of claim 5, wherein the enclosure is formed from plastic.

7. The humidity transfer assembly of claim 1, further comprising:
water disposed in the pressure vessel and defining a water level; and
a feed gas conduit extending from the enclosure and defining a conduit outlet disposed below the water level.

8. The humidity transfer assembly of claim 7, wherein an introduction of the feed gas from the feed gas conduit into the water vaporizes a portion of the water.

9. The humidity transfer assembly of claim 7, further comprising a water level controller configured to adjust a steam-to-carbon ratio for the feed gas in the pressure vessel by controlling the water level in the pressure vessel.

10. The humidity transfer assembly of claim 1, further comprising a polymer-electrolyte membrane disposed in the enclosure and separating the anode exhaust from the feed gas.

11. The humidity transfer assembly of claim 10, wherein the polymer-electrolyte membrane is formed from a hydrocarbon.

12. A fuel cell system comprising:
a pressure vessel;
an electrochemical hydrogen separator having an anode and a cathode; and
a humidity transfer device disposed in the pressure vessel, the humidity transfer device comprising:
an enclosure,
a first inlet line fluidly coupled to the enclosure and configured to supply anode exhaust from the anode to the enclosure,
a first outlet line fluidly coupled to the enclosure and configured to output the anode exhaust therefrom, and
a second inlet line fluidly coupled to the enclosure and configured to supply cathode exhaust from the cathode to the enclosure;
wherein the humidity transfer device is configured to transfer steam from the anode exhaust to the cathode exhaust to produce partially-humidified cathode exhaust, and to output the partially-humidified cathode exhaust into the pressure vessel; and
wherein the pressure vessel is configured to be pressurized with the partially-humidified cathode exhaust.

13. The fuel cell system of claim 12, further comprising a polymer-electrolyte membrane disposed in the humidity transfer device, the polymer-electrolyte membrane separating the cathode exhaust from the anode exhaust and passing steam therebetween.

14. The fuel cell system of claim 12, further comprising a fuel cell having an anode and a cathode;
wherein the anode of the electrochemical hydrogen separator is configured to receive anode exhaust from the anode of the fuel cell.

15. The fuel cell system of claim 12, further comprising an electrochemical hydrogen compressor having an anode and a cathode;
wherein the anode of the electrochemical hydrogen compressor is configured to receive humidified cathode exhaust from the pressure vessel.

16. The fuel cell system of claim 15, wherein:
the cathode of the electrochemical hydrogen compressor is configured to output hydrogen; and
wherein at least a portion of the hydrogen is mixed with the cathode exhaust output from the cathode of the electrochemical hydrogen separator.

17. The fuel cell system of claim 16, wherein the hydrogen is mixed with the cathode exhaust upstream from the humidity transfer device.

18. A fuel cell system comprising:
a pressure vessel;
a fuel cell having an anode and a cathode;
an electrochemical hydrogen separator having an anode and a cathode; and
a humidity transfer device disposed in the pressure vessel, the humidity transfer device comprising:
an enclosure,
a first inlet line fluidly coupled to the enclosure and configured to supply anode exhaust from the anode of the fuel cell to the enclosure,
a first outlet line fluidly coupled to the enclosure and configured to output the anode exhaust therefrom, and
a second inlet line fluidly coupled to the enclosure and configured to supply cathode exhaust from the cathode of the electrochemical hydrogen separator to the enclosure;
wherein the humidity transfer device is configured to transfer steam from the anode exhaust to the cathode exhaust to produce partially-humidified cathode exhaust, and to output the partially-humidified cathode exhaust into the pressure vessel; and
wherein the pressure vessel is configured to be pressurized with the partially-humidified cathode exhaust.

19. The fuel cell system of claim 18, further comprising a polymer-electrolyte membrane disposed in the humidity transfer device, the polymer-electrolyte membrane separating the cathode exhaust from the anode exhaust and passing steam therebetween.

20. The fuel cell system of claim 18,
wherein the humidity transfer device is configured to output dehumidified anode exhaust to the anode of the electrochemical hydrogen separator.

\* \* \* \* \*